US009734096B2

(12) United States Patent
Lee et al.

(10) Patent No.: US 9,734,096 B2
(45) Date of Patent: Aug. 15, 2017

(54) METHOD AND SYSTEM FOR SINGLE ROOT INPUT/OUTPUT VIRTUALIZATION VIRTUAL FUNCTIONS SHARING ON MULTI-HOSTS

(71) Applicant: INDUSTRIAL TECHNOLOGY RESEARCH INSTITUTE, Hsinchu (TW)

(72) Inventors: Chao-Tang Lee, Zhubei (TW); Tzi-Cker Chiueh, Taipei (TW); Cheng-Chun Tu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 551 days.

(21) Appl. No.: 13/887,634

(22) Filed: May 6, 2013

(65) Prior Publication Data
US 2014/0331223 A1 Nov. 6, 2014

(51) Int. Cl.
*G06F 9/455* (2006.01)
*G06F 13/10* (2006.01)
*G06F 13/24* (2006.01)

(52) U.S. Cl.
CPC ........ *G06F 13/105* (2013.01); *G06F 9/45558* (2013.01); *G06F 13/24* (2013.01);
(Continued)

(58) Field of Classification Search
CPC .... G06F 13/105; G06F 9/45558; G06F 13/24; G06F 2009/45579; G06F 2213/2414
See application file for complete search history.

(56) References Cited

U.S. PATENT DOCUMENTS 7,882,330 B2 * 2/2011 Haertel ............... G06F 9/45558
711/203
7,979,592 B1 7/2011 Pettey et al.
(Continued)

FOREIGN PATENT DOCUMENTS

CN 102707991 A 10/2012
CN 102722414 A 10/2012
(Continued)

OTHER PUBLICATIONS

Intel 82599 SR-IOV Driver Companion Guide, May 2010.*
(Continued)

*Primary Examiner* — James J Lee
(74) *Attorney, Agent, or Firm* — Rabin & Berdo, P.C.

(57) ABSTRACT

In a method for SR-IOV Virtual Functions Sharing on Multi-Hosts, implemented in a management system, one or more fake devices are simulated in one or more hosts with each fake device corresponding to one of a plurality of SR-IOV virtual functions. Each of one or more configuration spaces is redirected from each SR-IOV virtual function to each fake device, respectively. Each of configuration space requests is redirected from a corresponding fake device to a corresponding SR-IOV virtual function when the configuration space request is received. And each of memory access operations is redirected from the corresponding SR-IOV virtual function to a mapped memory on a corresponding host with the corresponding fake device, and each of interrupts generated by one or more SR-IOV virtual machines is redirected to the corresponding fake device.

10 Claims, 14 Drawing Sheets

(52) U.S. Cl.
CPC .............. *G06F 2009/45579* (2013.01); *G06F 2213/2414* (2013.01)

(56) References Cited

U.S. PATENT DOCUMENTS

| | | | |
|---|---|---|---|
| 8,041,871 B2 | 10/2011 | Deshpande et al. | |
| 8,521,941 B2* | 8/2013 | Regula | G06F 13/404 710/105 |
| 9,146,890 B1* | 9/2015 | Brown | G06F 13/4022 |
| 2006/0253619 A1* | 11/2006 | Torudbakken | G06F 13/4022 710/31 |
| 2008/0137677 A1* | 6/2008 | Boyd | G06F 13/385 370/419 |
| 2008/0147938 A1* | 6/2008 | Freimuth | G06F 13/4022 710/105 |
| 2008/0148032 A1* | 6/2008 | Freimuth | G06F 13/42 713/1 |
| 2008/0148295 A1* | 6/2008 | Freimuth | G06F 9/4856 719/324 |
| 2011/0202701 A1 | 8/2011 | Maitra | |
| 2012/0096192 A1* | 4/2012 | Tanaka | G06F 13/385 710/20 |
| 2012/0166690 A1 | 6/2012 | Regula | |
| 2012/0167085 A1 | 6/2012 | Subramaniyan et al. | |
| 2013/0033981 A1 | 2/2013 | Droux et al. | |

FOREIGN PATENT DOCUMENTS

| | | | |
|---|---|---|---|
| TW | 201217983 A | 5/2012 |
| TW | 201243724 A | 11/2012 |

OTHER PUBLICATIONS

ACMqueue I/O Virtualization, Rosenblum et al., 2011.*

Byrne et al., Power-efficient networking for balanced system designs: early experiences with PCIe, Oct. 23, 2011, HotPower '11 Proceedings of the 4th Workshop on Power-Aware Computing and Systems, pp. 1-5.

Multi-Host System and Intelligent I/O Design with PCI Express, 2004, PLX Technology, Inc., 4 pages.

Regula, Using Non-transparent Bridging in PCI, Express Systems, Jun. 1, 2004, PLXtech, pp. 1-31.

Mayhew et al., PCI Express and Advanced Switching: Evolutionary Path to Building Next Generation Interconnects, 2003, *IEEE Xplore Digital library*,eeexplore.ieee.org, 9 pages.

Taiwan Patent Office, Office Action, Patent Application Serial No. TW102117588, Jul. 6, 2015, Taiwan.

China Patent Office, Office Action, Patent Application Serial No. CN201310295647.7, Nov. 28, 2016, China.

Intel® 82599 SR-IOV Driver Companion Guide, May 2010, pp. 1-40.

Rosenblum et al., ACMqueue I/O Virtualization, Dec. 2011, pp. 1-10.

\* cited by examiner

METHOD AND SYSTEM FOR SINGLE ROOT INPUT/OUTPUT VIRTUALIZATION VIRTUAL FUNCTIONS SHARING ON MULTI-HOSTS

TECHNICAL FIELD

The present disclosure generally relates to a method and system for Single Root Input/Output Virtualization (SR-IOV) Virtual Functions (VFs) Sharing on Multi-Hosts.

BACKGROUND

Virtualization involves a way to run multiple virtual machines (VMs) on one or more devices or systems. When using virtualization, extra processing power(s) and/or storage(s) on a device may be more efficiently used by sharing it between multiple VMs. Typically these systems are constructed in a manner that allows programs running within a VM to operate without knowledge that the VM is sharing resources with other VMs. Besides the interoperability, VMs also consider security concerns. Typically, I/O virtualization solutions provide the same isolation that was found when the VM was operating on a separate physical machine. Isolation involves separation of memory space, input/output (I/O) streams, interrupts, and the ability to isolate control operations, I/O operations, and errors.

There are many available computer I/O interconnect standards. One of the I/O interconnect standards has been the peripheral component interconnect (PCI) standard. The PCI allows the bus to act like a bridge, which isolates a local processor bus from the peripherals, allowing a Central Processing Unit (CPU) of the computer to run faster. A successor to PCI (termed PCI Express or PCIe) provides higher performance, increased flexibility and scalability for next-generation systems, while maintaining software compatibility with existing PCI applications. Compared to legacy PCI, the PCI Express protocol is more complex, with three layers, i.e. the transaction layer, the data link layer and the physical layer.

In a PCI Express system, a root complex device connects a processor and a memory subsystem to a PCIe switch fabric having one or more switch devices. In a PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express ports and multiple switch devices may be connected to ports on the root complex or cascaded. FIG. 1 shows an exemplary standard PCIe device 100, having such as three different functions, each with its own physical resources, respectively, as well as an internal routing 103, configuration resources 105, and a PCIe port 107. PCIe functionality shared by all functions is managed through function 0. A PCIe device may typically support up to 8 functions.

The Single-Root Input/Output Virtualization (SR-IOV) standard was introduced to standardize a way to share PCIe devices in a way that virtualization goals are still met. SR-IOV provides a mechanism by which a single root function (such as a single Ethernet port) may appear to be multiple separate physical devices. In this manner, a port leading to a PCIe device may be shared between multiple VMs, thus effectively sharing the PCIe devices between the VMs without either VM needing to be aware of the existence of the other. A SR-IOV-capable device (such as a PCIe endpoint) may be configured to appear in the PCI configuration space as multiple functions, each with its own configuration space complete with Base Address Registers (BARs). A VM manager (VMM) assigns one or more virtual functions to a VM by mapping the actual configuration space of the virtual functions to the configuration space presented to the VM by the VMM.

SR-IOV introduces the concepts of physical functions and virtual functions. A physical function is a PCIe function that supports the SR-IOV capability. A virtual function is a lightweight function that is associated with a physical function but that may be assigned to a particular VM. In other words, one or more virtual functions may be assigned to one VM. All of this capability is managed through the VMM in coordination with the component in the hypervisor that manages the SR-IOV virtual functions. FIG. 2 shows a schematic view of an exemplary PCIe SR-IOV capable device. In FIG. 2, the PCIe SR-IOV capable device 200 has two physical functions, and each physical function (PF) has three virtual functions respectively. In reality, there may be any number of physical functions (up to device limits), and each physical function may have a respective number of associated virtual functions. While an SR-IOV allows multiple VMs within a single host to share physical resources. There is no capability to allow VMs across multiple hosts to share physical resources. An SR-IOV only allows a single root complex, and thus a single host, to share resources of an attached PCIe device.

With PCIe devices expanding rapidly, it is now more standards to have devices, such as switches, connecting multiple hosts to multiple PCIe devices. It would be advantageous to allow these multiple hosts to share PCIe endpoint functions, because it would allow for the PCIe endpoint functions to be dynamically provisioned among the hosts to meet workload requirements. One solution is known as Multi-Root Input/Output Virtualization (MR-IOV). This scheme has been standardized. If one were to try and implement it on a new switch, the lack of availability of MR-IOV compatible PCIe endpoints would make such a switch virtually useless.

An existing solution, i.e. Non-Transparent-Bridge (NTB) device, is described that uses resource redirection methods when multiple hosts are connected using the non-transparent ports of a PCIe switch that supports shared I/O mechanisms. FIG. 3 shows an exemplary schematic view illustrating sharing virtual functions to multiple hosts through NTB devices. As seen in FIG. 3, when the multiple hosts are connected using the non-transparent ports of a PCIe transparent switch 301, each NTB device allows the multi-root sharing of endpoint functions using the existing SR-IOV standard that is in use by a large number of devices, thus having the advantages of MR-IOV without needing to actually implement MR-IOV.

FIG. 4 shows an exemplary schematic view illustrating both the physical and virtual hierarchies for a single host's sharing of a plurality of SR-IOV endpoints. In FIG. 4, the physical structures includes a non-transparent port 400 connected to a host 402, a transparent PCI-to-PCI bridge 404 of the upstream port, and the global space/management hierarchy 406 where the SR-IOV endpoints connect. For each of downstream ports 408, 410 and 412 in the management hierarchy 406 that connects to one of share endpoints 414, 416 and 418, there is a corresponding emulated virtual PCI-to-PCI bridge of virtual PCI-to-PCI (P-P) bridges 420, 422 and 424, respectively. The emulated virtual PCI-to-PCI bridges' registers are located in a memory 426 of a management processor 428. These registers are accessed by redirecting control and status register (CSR) requests to the management processor 428.

Normally, a data moving operation between application(s), kernel(s), driver(s) and device hardware may be operated as follows. For example, in the case that data is moved from an application to a device, a driver in the kernel space or the application may allocate a data buffer when it need to do a data move operation. The application may get an address for the data buffer from the driver, and move the data to the data buffer when the data is ready. The driver then triggers such as a DMA operation of hardware by putting the address for the data buffer into a DMA transmitter/receiver descriptor in the device. The device may issue the DMA operation and gets the data. For the other direction, the driver allocates the data buffer and puts the address into the DMA transmitter/receiver descriptor when the data is coming. The device will access the data into the data buffer after the data is ready. The application also gets the data from the data buffer through the address of the data buffer which comes from the driver. This scheme is called zero-copy because there is no other data copy between the application and the device. In the current architectures of the memory usage of the shared device driver for a DMA operation between the application and the shared device, the NTB mapped buffer is fixed and the allocated data buffer of the driver or the application could be anywhere in the RAM memory, so there needs another data copy from the data buffer to a NTB mapped buffer.

Normally one SR-IOV device may support more than such as 100 virtual functions but only 20% or 30% of virtual machines in one server. Most of the virtual functions are wasted. To use the SR-IOV virtual functions more efficiently, it may design that multiple hosts and virtual machines may share the virtual functions of SR-IOV devices in a more intuitive, secure and transparent way. Just like the virtual functions are really plugged in each host.

SUMMARY

The exemplary embodiments of the disclosure may provide a method and system for Single Root Input/Output Virtualization (SR-IOV) Virtual Functions (VFs) Sharing on Multi-Hosts.

One exemplary embodiment relates to a method for SR-IOV Virtual Functions Sharing on Multi-Hosts. The method may be implemented in a management system connected to a transparent device. The method may comprise: simulating one or more fake devices in one or more hosts with each fake device corresponding to one of a plurality of SR-IOV virtual functions; redirecting each of one or more configuration spaces from each of the SR-IOV virtual functions to each of the one or more fake devices, respectively; redirecting each of configuration space requests from a corresponding fake device to a corresponding SR-IOV virtual function when the configuration space request being received; and redirecting each of memory access operations from the corresponding SR-IOV virtual function to a mapped memory on a corresponding host with the corresponding fake device, and each of interrupts generated by one or more SR-IOV virtual machines to the corresponding fake device.

Another exemplary embodiment relates to a system for SR-IOV Virtual Functions Sharing on Multi-Hosts. The system may comprise a transparent device, a management system connected to the transparent device, and one or more fake devices simulated in each host of one or more hosts with each fake device corresponding to one of SR-IOV virtual functions on a SR-IOV device. The management system may detect one or more physical functions of the SR-IOV and the SR-IOV virtual functions extended from the one or more physical functions, and configure one or more NTB devices in the one or more hosts. Wherein, the host may detect the existence of the fake devices, and map the fake devices and the SR-IOV virtual functions used by the host and one or more virtual machines on the host.

DETAILED DESCRIPTION OF DISCLOSED EMBODIMENTS

Figure 1:
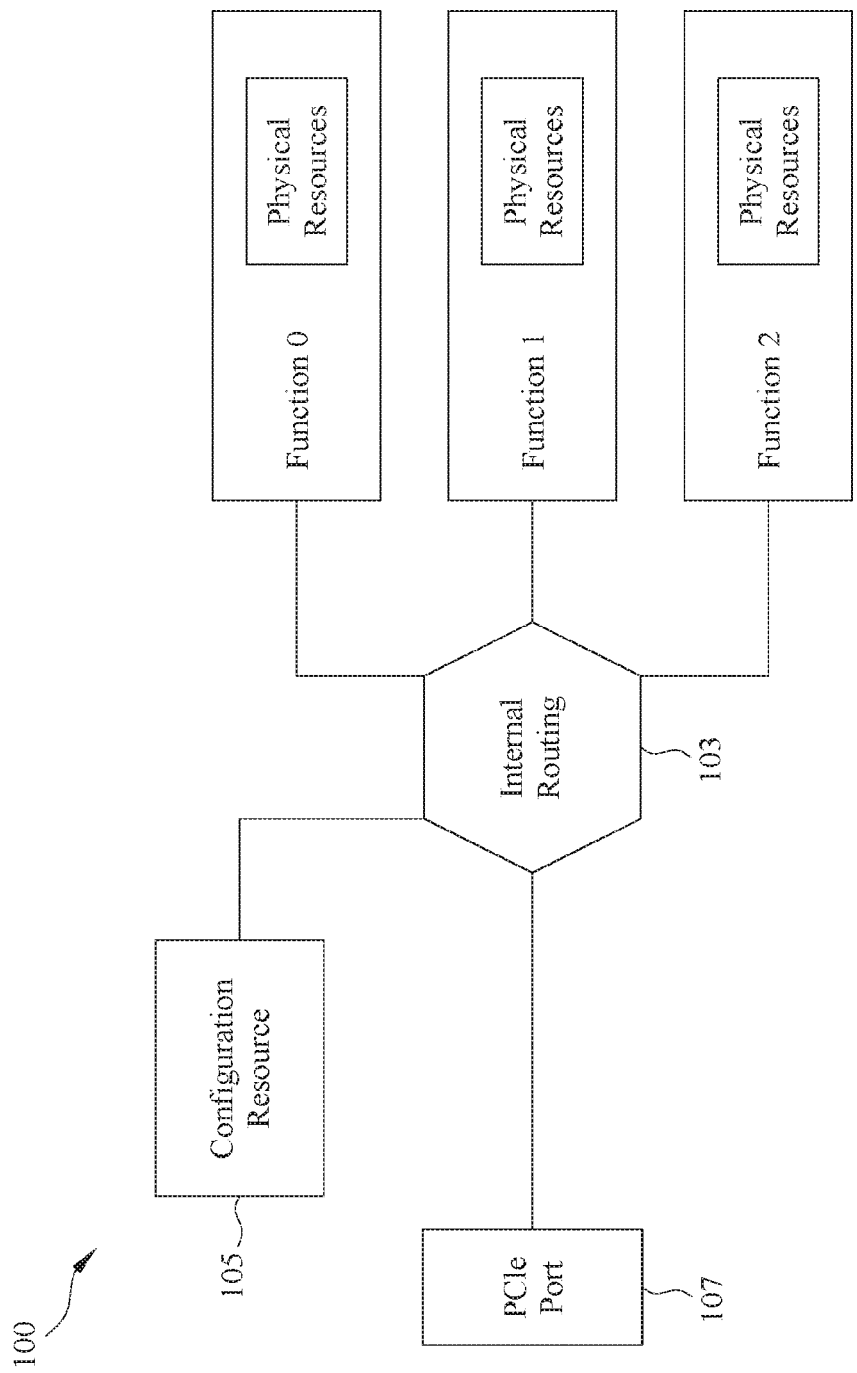
FIG. 1 shows a schematic view of an exemplary standard PCIe device.
Figure 2:
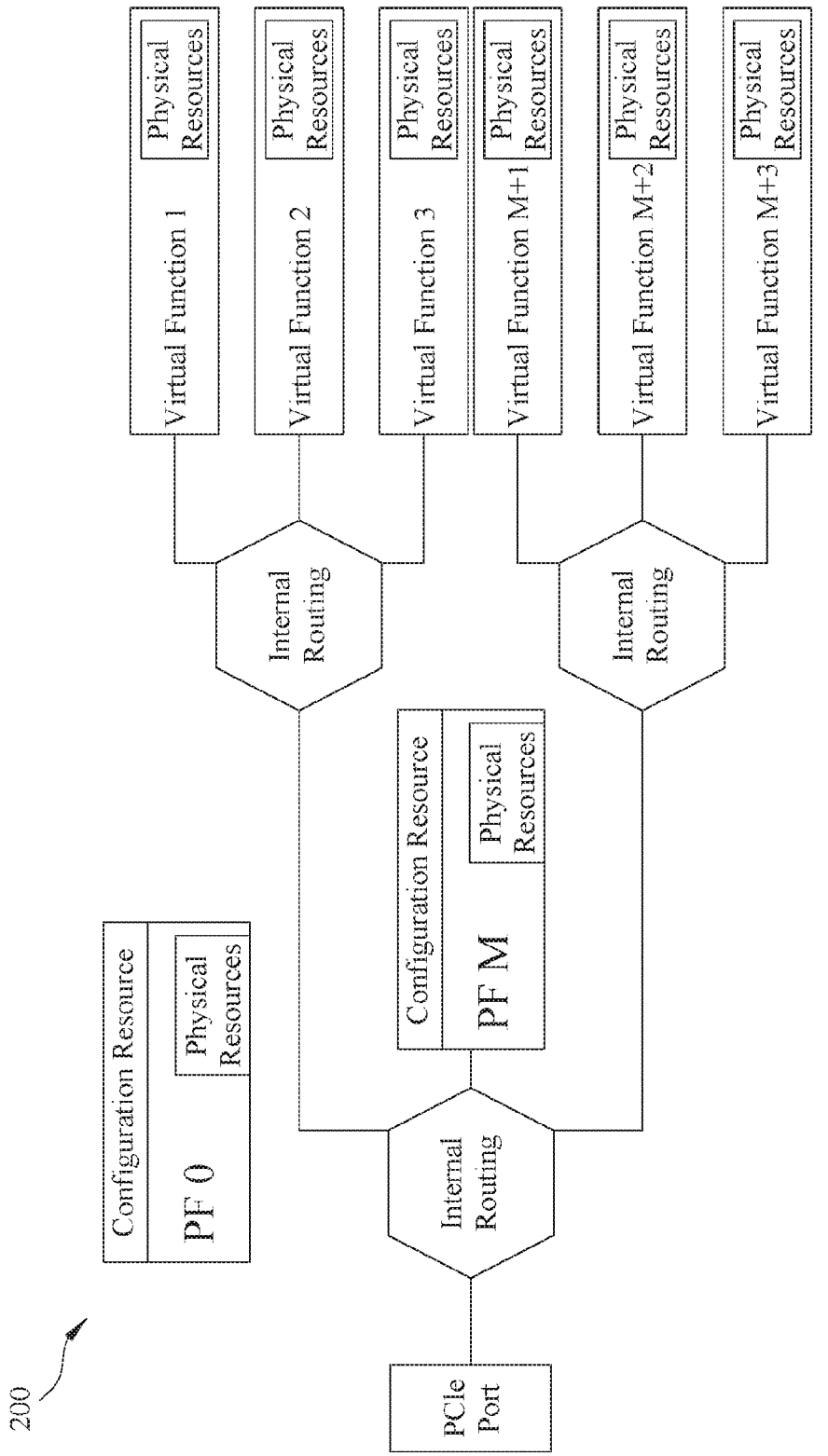
FIG. 2 shows a schematic view of an exemplary PCIe SR-IOV capable device.
Figure 3:
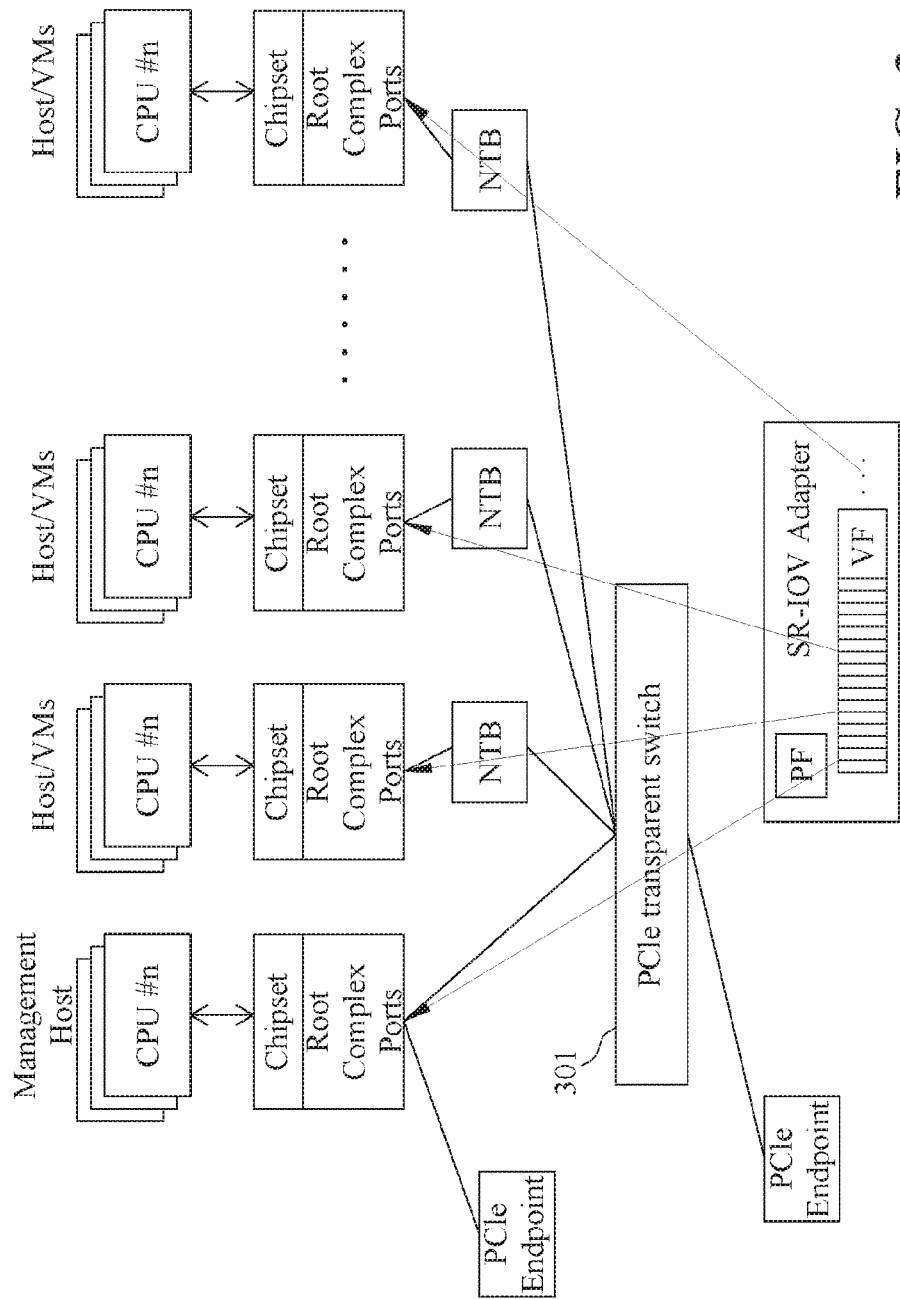
FIG. 3 shows a schematic view illustrating sharing virtual functions to multiple hosts through NTB devices.
Figure 4:
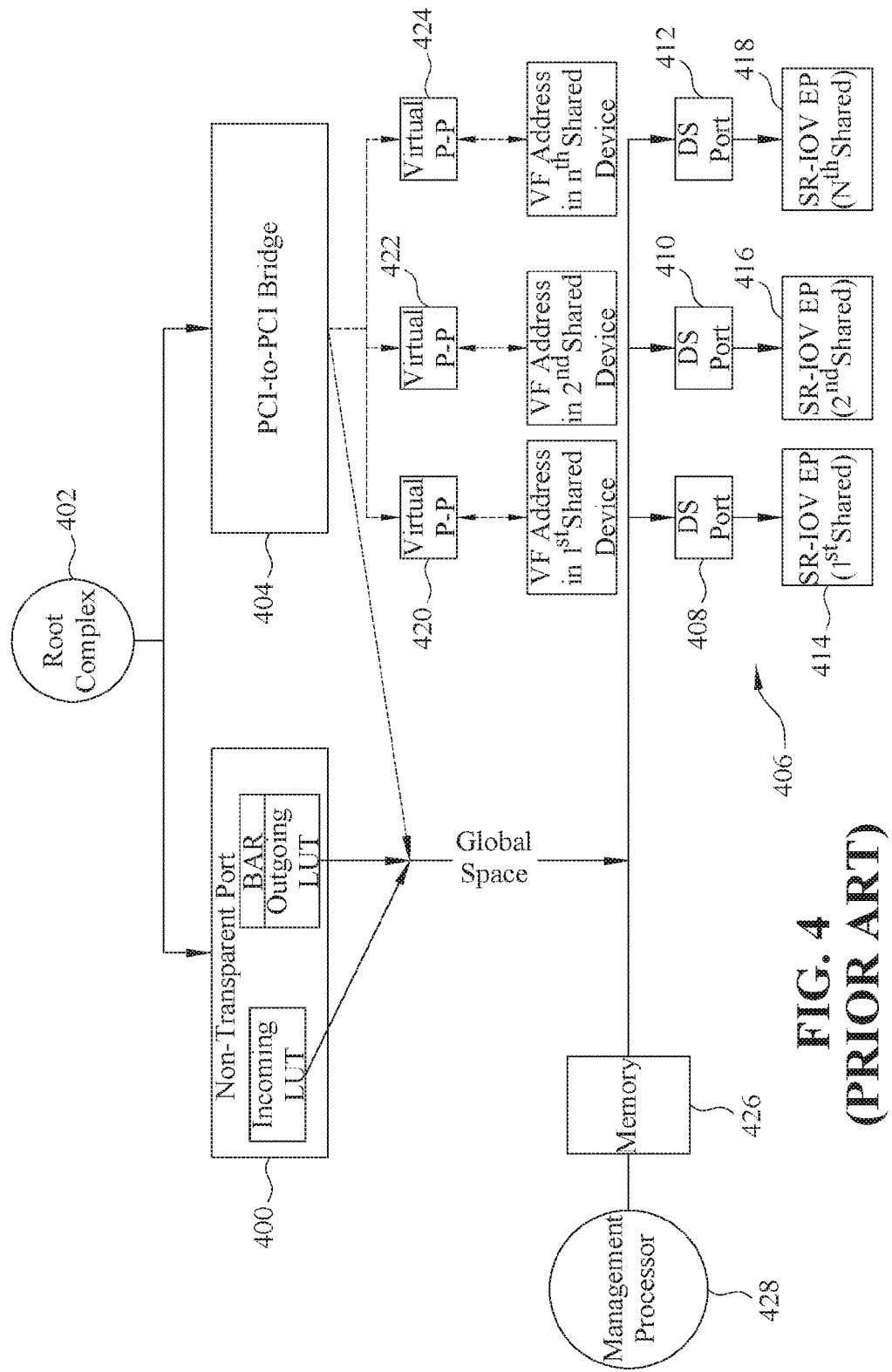
FIG. 4 shows a schematic view illustrating both the physical and virtual hierarchies for a single host's sharing of a plurality of SR-IOV endpoints.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiments in the disclosure provide a technique that allows multiple hosts and their virtual machines to share the virtual functions of SR-IOV devices. Just like the virtual functions are really plugged in each host. The zero-modification original SR-IOV virtual function driver may work directly on hosts and virtual machines with data zero-copy operation. In the exemplary embodiments, all the virtual functions may be redirected to any connected host and or virtual machines on the host and each virtual function may work in its native way and performance.

To accomplish this, the exemplary embodiments may simulate one or more fake devices such as fake PCIe device(s) in one or more hosts with each fake device corresponding to one of SR-IOV virtual functions, and redirect a configuration space from a SR-IOV virtual function to a fake PCIe device through a Non-Transparent Bridge (NTB) device. The memory such as a DRAM memory in a host with a fake PCIe device is mapped to a SR-IOV virtual function as a direct memory access (DMA) buffer through the NTB device. A Message-Signaled-Interrupt (MSI) address of a SR-IOV virtual function is remapped to a MSI address of the host with a fake PCIe device. Any received configuration space request is redirected from a fake device to a SR-IOV virtual function. Any memory operation such as a DMA operation from a SR-IOV virtual function is redirected to a mapped memory on the host with the fake PCIe device. An interrupt generated by a SR-IOV virtual machine is redirected to a corresponding fake PCIe device. In view of the host with the fake PCIe device, a PCIe device is like really plugged in it.

Figure 5:
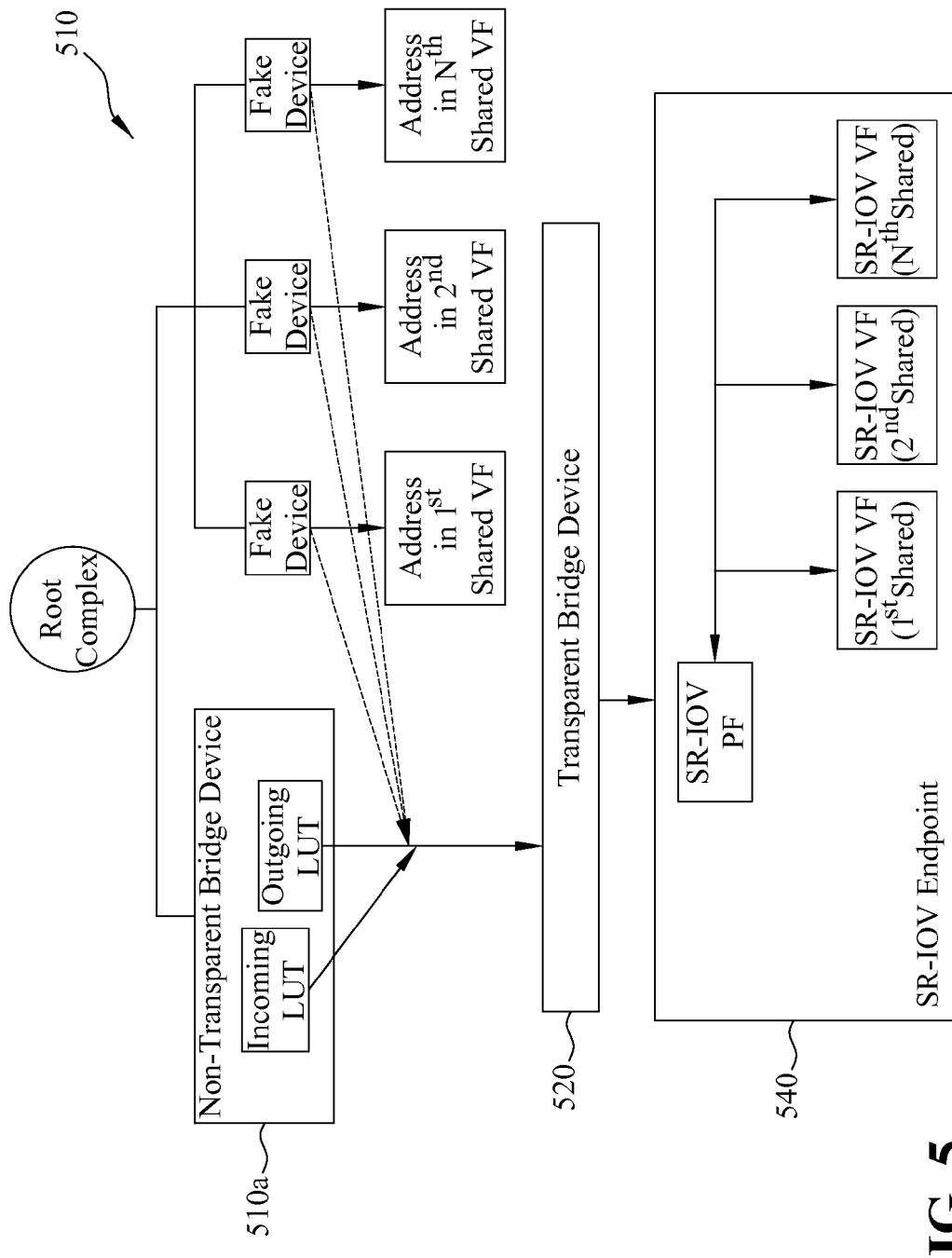
FIG. 5 shows a schematic view illustrating the sharing of several SR-IOV virtual functions through a NTB device in a single host's environment, according to an exemplary embodiment.

FIG. 5 shows a schematic view illustrating the sharing of several SR-IOV virtual functions through a NTB device in a single host's environment, according to an exemplary embodiment. Wherein both the physical and the virtual hierarchies in an exemplary application scenario for a single host's sharing of several SR-IOV virtual functions are illustrated. Referring to FIG. 5, the physical structures in the environment may include a non-transparent bridge (NTB) device 510*a* in a shared host 510 having N fake device(s) therein, N is a positive integer, and a global space/management hierarchy (not shown) where a SR-IOV endpoint 540 (such as a SI-IOV device) connects. The NTB device 510*a* may connect to a transparent bridge (TB) device 520, such as a PCIe frabric or a PCIe switch. The transparent bridge device 520 may connect to the SR-IOV endpoint 540. The SR-IOV endpoint 540 may include, for example, a SR-IOV physical function (PF) and N SR-IOV virtual function(s). One or more configuration space requests or CSR requests to the N fake devices are redirected to the N corresponding SR-IOV virtual functions. Through the NTB device 510*a* including an incoming look up table (LUT) and an outgoing LUT, a Message-Signaled-Interrupt (MSI) address of each of the SR-IOV virtual function(s) may be remapped to an address of a memory on the host 510 with a corresponding fake device.

A normal SR-IOV operation procedure in the SR-IOV standard may include the followings. After a shared host system starts up and the host's kernel boots up, only the SR-IOV physical function(s) is known by the shared host system. After loading the driver for the SR-IOV physical function(s), the shared host system is aware of the SR-IOV virtual functions. Then the SR-IOV virtual function driver is loaded and the virtual functions become available.

Figure 6:
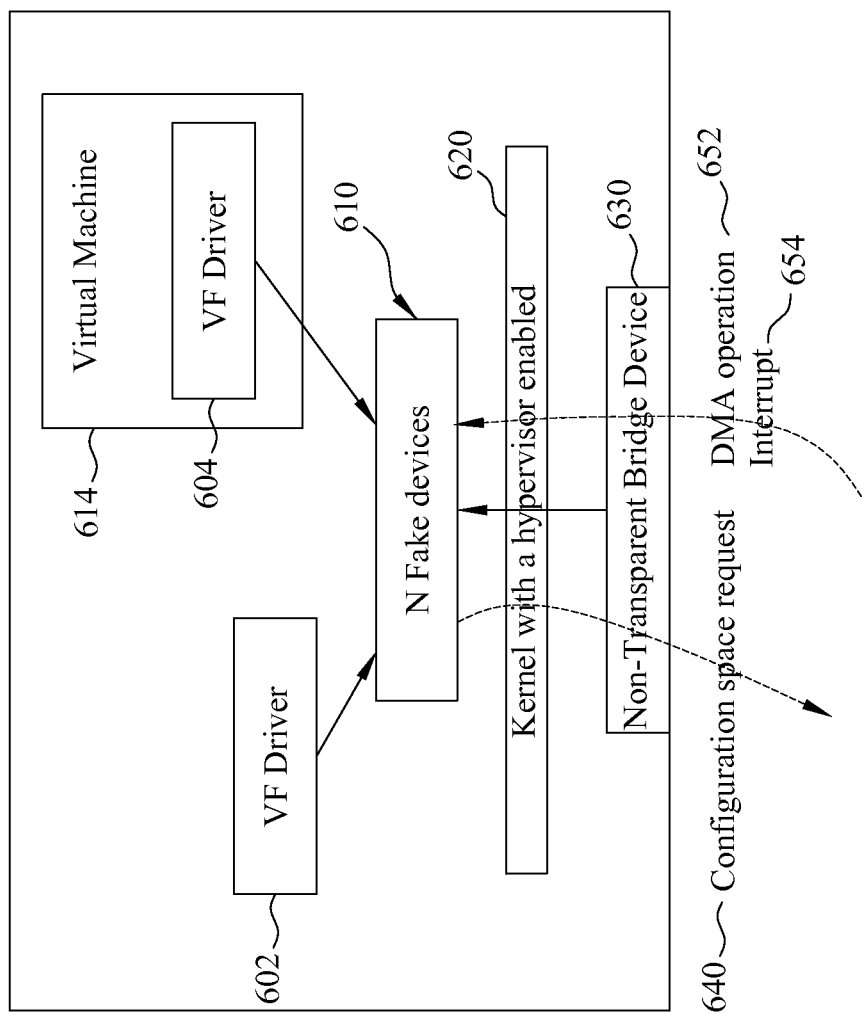
FIG. 6 shows a schematic view illustrating how fake devices in the host's kernel are simulated to share corresponding SR-IOV virtual functions, according to an exemplary embodiment.

Therefore, in order to use fake devices to share the SR-IOV virtual functions, the exemplary embodiments may include the following procedures. After a shared host system starts up, the shared host system is aware of multiple devices as configured. For example, the shared host system may detect the existence of an input/output (I/O) device because the fake device may give a response when I/O devices are plugged. Then a NTB driver may be loaded to map all the fake I/O devices with real SR-IOV virtual functions. The SR-IOV virtual functions are available when the SR-IOV virtual function driver is loaded. FIG. 6 shows a schematic view illustrating how fake devices are simulated by a host's kernel to share SR-IOV virtual functions, according to an exemplary embodiment. Wherein, assume that a management system (not shown) is ready, then the host starts up and the virtual function driver is loaded on the host's side. Also, the SR-IOV virtual functions are available in a SR-IOV device (not shown).

Referring to FIG. 6, N fake devices 610 such as fake PCIe devices may be simulated by interpreting PCI read and/or write routines in a kernel 620 of a shared host 600 and feeding back a correct response when the kernel 620 accesses the fake devices 610 with their IDs of simulated fake devices, respectively. The kernel may enable a hypervisor to simulate the fake devices to share the SR-IOV virtual functions. Through a NTB device 630, a configuration space request 640 is redirected from the kernel 620 to a corresponding SR-IOV virtual function when the configuration space request 640 is received. A memory access operation such as a DMA operation 652 and an interrupt 654 such as a MSI, are redirected to the host 600 with a corresponding fake device of the fake devices 610. Therefore, a MSI address of the SR-IOV virtual function is remapped to a MSI address of a memory on the host 600 with the corresponding fake device. The interrupt generated by the SR-IOV virtual machine is redirected to the corresponding fake device. The fake devices 610 may be assigned to a virtual machine 614 in the shared host 600 or assigned to Dom0 (first guest operation system). The same VF driver 602 may work both on Dom0 and the virtual machine 614.

According to an exemplary embodiment, for SR-IOV virtual functions (VFs) sharing into a single host, a SR-IOV unaware or aware and hypervisor enabled system may include two types of fake PCIe devices that are mapped to corresponding real SR-IOV virtual functions. Wherein, one type of fake devices may be used by Dom0 (first guest operation system) and the other type of fake devices may be used by the virtual machines through a PCI pass through mode.

Figure 7A:
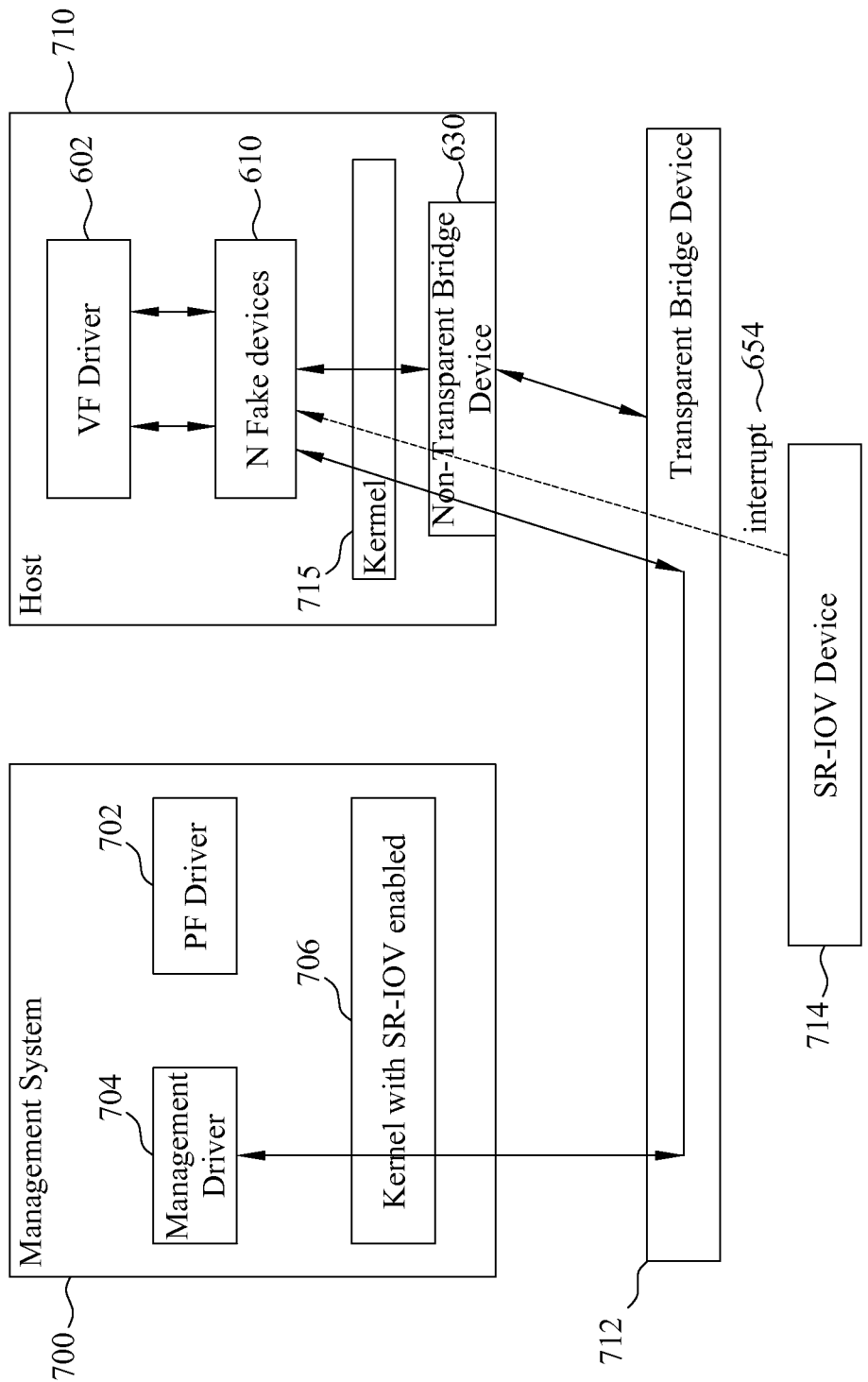
FIG. 7A shows the hardware and software architectures of multiple virtual functions shared into a single host, according to an exemplary embodiment.

FIG. 7A shows the hardware and software architecture of multiple virtual functions shared into a single host, according to an exemplary embodiment. In the FIG. 7, the PCIe hierarchy for a management system 700 may include a transparent bridge device 712, such as a PCIe fabric or a PCIe switch, and a SR-IOV device 714. A single host 710 600 with a kernel 715 connects with the transparent bridge device 712 by the NTB device 630. A kernel 706 (with SR-IOV enabled) in the management system 700 detects the existence of physical functions of the SR-IOV, and detects virtual functions extended from the existed physical functions after a physical function driver 702 is loaded. The physical function driver 702 in the management system 700 controls and manages the virtual functions of the SR-IOV device 714. A management driver 704 in the management system 700 assigns the mapping between the virtual functions of the SR-IOV device 714 and the fake devices 610 of the shared host 710.

Figure 7B:
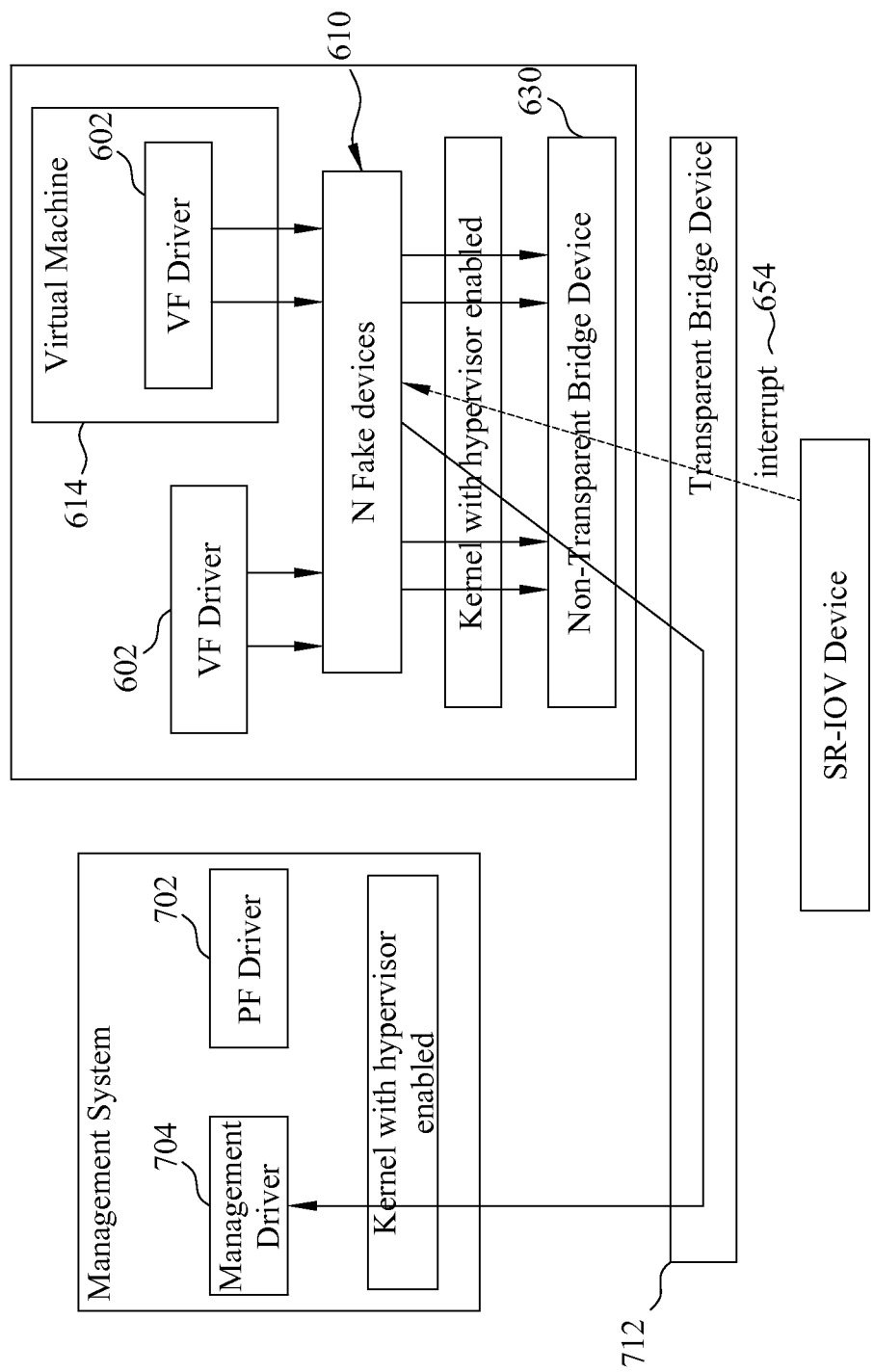
FIG. 7B shows an application exemplar of FIG. 7A, according to an exemplary embodiment.

The fake devices 610 may be assigned to the virtual machine(s) on the shared host 710 or assigned to a Dom0 (a kernel with a hypervisor enabled). The same VF driver 602 may work both on the Dom0 and the virtual machine(s). FIG. 7B shows the application exemplar, according to an exemplary embodiment. In the application exemplar, the fake devices may be assigned to the virtual machine(s) on a shared host or assigned to the Dom0, and the same VF driver 602 may work both on the Dom0 and the virtual machine(s) 614. The kernel in the management system enables a hypervisor. The kernel in the host also enables a hypervisor.

In the management system's side, the procedures of using the fake devices to share virtual functions may operate as follows. When the management system starts up, the kernel of the management system may detect the physical functions of the SR-IOV, and detect the virtual functions extended from the existed physical functions after the physical function driver 702 is loaded. The management system then loads a NTB driver to configure the NTB device. In the host's side, the procedures of using the fake devices to share virtual functions may operate as follows. When the host starts up, the kernel of the host may detect the existence of the fake devices, and load the NTB driver to map the fake devices and the SR-IOV virtual functions. Then, the host and the virtual machine(s) on the host may load the original virtual function driver to use the fake devices.

Figure 8:
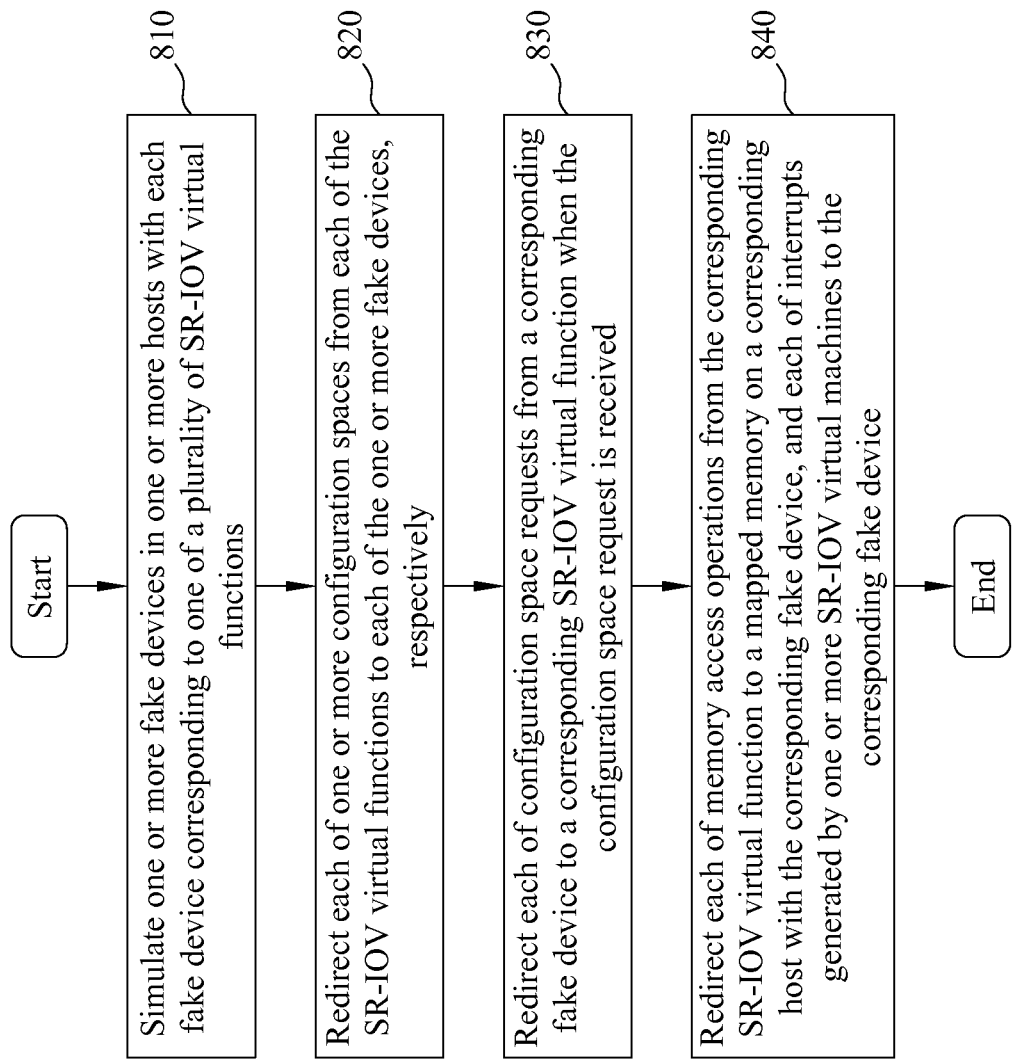
FIG. 8 shows a method for SR-IOV Virtual Functions (VFs) sharing on multi-hosts, according to an exemplary embodiment.

FIG. 8 shows a method for SR-IOV Virtual Functions (VFs) sharing on multi-hosts, according to one exemplary embodiment. The method may be implemented in a management system connected to a transparent device, such as a PCIe fabric or a PCIe switch. At step 810, one or more fake devices are simulated, such as by each kernel, in one or more hosts with each fake device corresponding to one of SR-IOV virtual functions. At step 820, each of one or more configuration spaces is redirected from each of the SR-IOV virtual functions to each of the fake devices, such as through each of NTB device(s) in the host(s), respectively. At step 830, each of configuration space requests is redirected from a corresponding fake device to a corresponding SR-IOV virtual function when the configuration space request is received. And, at step 840, each of memory access operations is redirected from the corresponding SR-IOV virtual function to a mapped memory on a corresponding host with the corresponding fake device, and each of interrupts generated by one or more SR-IOV virtual machines is redirected to the corresponding fake device. Accordingly, the address of each shared SR-IOV virtual function may be remapped to the address of a memory such as a DRAM on the corresponding host with the corresponding fake device.

Figure 9A:
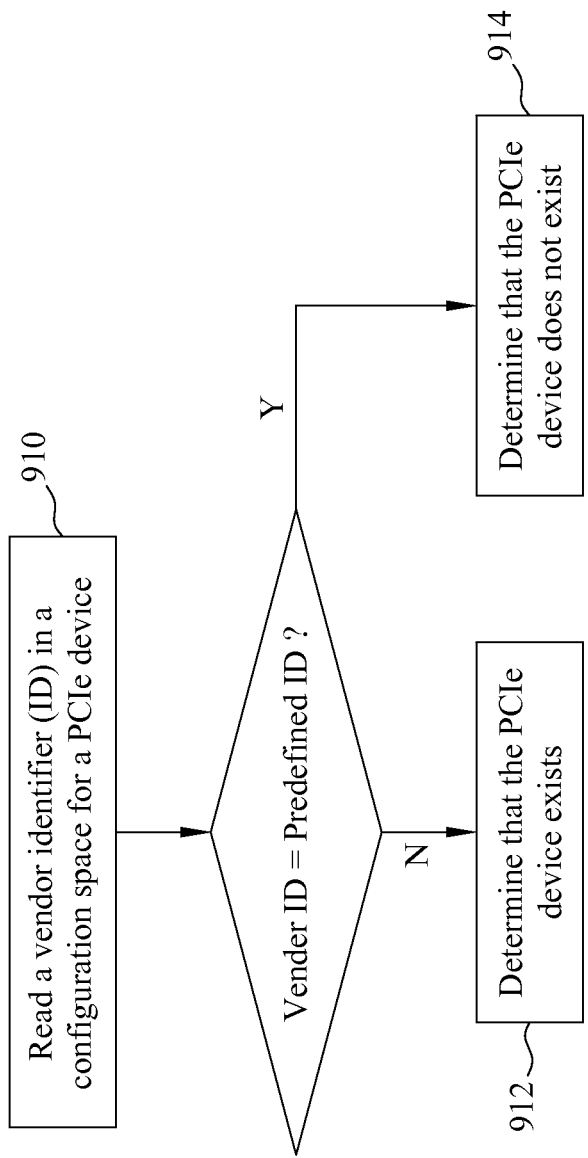
FIG. 9A shows the operation on how the kernel detects the existence of a PCIe device, according to an exemplary embodiment.

According to an exemplary embodiment, FIG. 9A further illustrates how a kernel detects the existence of a PCIe device. Referring to FIG. 9A, the kernel of a shared host may read a vendor identifier (ID) in a configuration space for a PCIe device (step 910), where per PCIe ID may be, but not limited to a bus ID, a device ID, or a function ID. When the vendor ID is not a predefined identifier such as 0xffff ffff, the kernel may determine that the PCIe device exists (step 912). When the vendor ID is the predefined identifier, the kernel may determine that the PCIe device does not exist (step 914). In the exemplary embodiment, a plurality of PCIe IDs may be selected as the PCIe IDs for the fake devices to share the SR-IOV virtual functions. When the kernel determines that the existence of the PCIe device, it may further interpret PCI read and write operations to the PCIe configuration space.

Figure 9B:
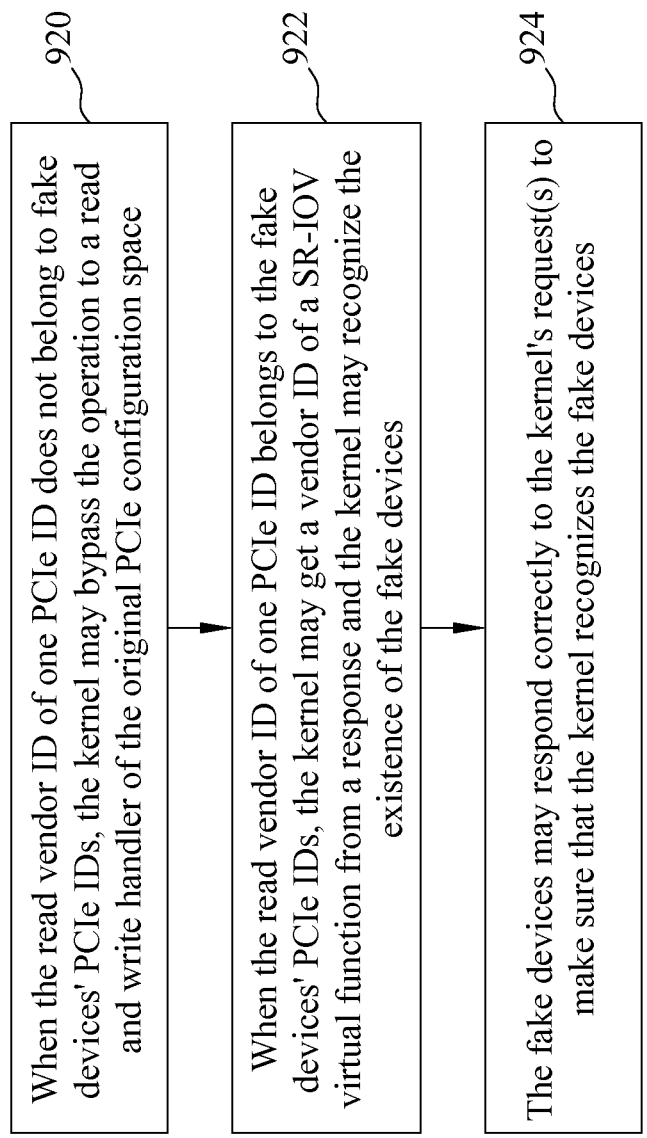
FIG. 9B shows the operation on how the kernel interprets PCI read or write operations to the PCIe configuration space, according to an exemplary embodiment.

According to an exemplary embodiment, FIG. 9B further illustrates how the kernel interprets PCI read and write operations to a PCIe configuration space. Referring to FIG. 9B, when a read vendor ID of one PCIe ID does not belong to fake devices' PCIe IDs, the kernel may bypass the operation to a read and write handler of the original PCIe configuration space (step 920). When the read vendor ID of one PCIe ID belongs to the fake devices' PCIe IDs, the kernel may get a vendor ID of a SR-IOV virtual function from a response and the kernel may recognize the existence of the fake devices (step 922). Also, the fake devices may respond correctly to the kernel's request(s) to make sure that the kernel recognizes the fake devices (step 924).

Figure 10:
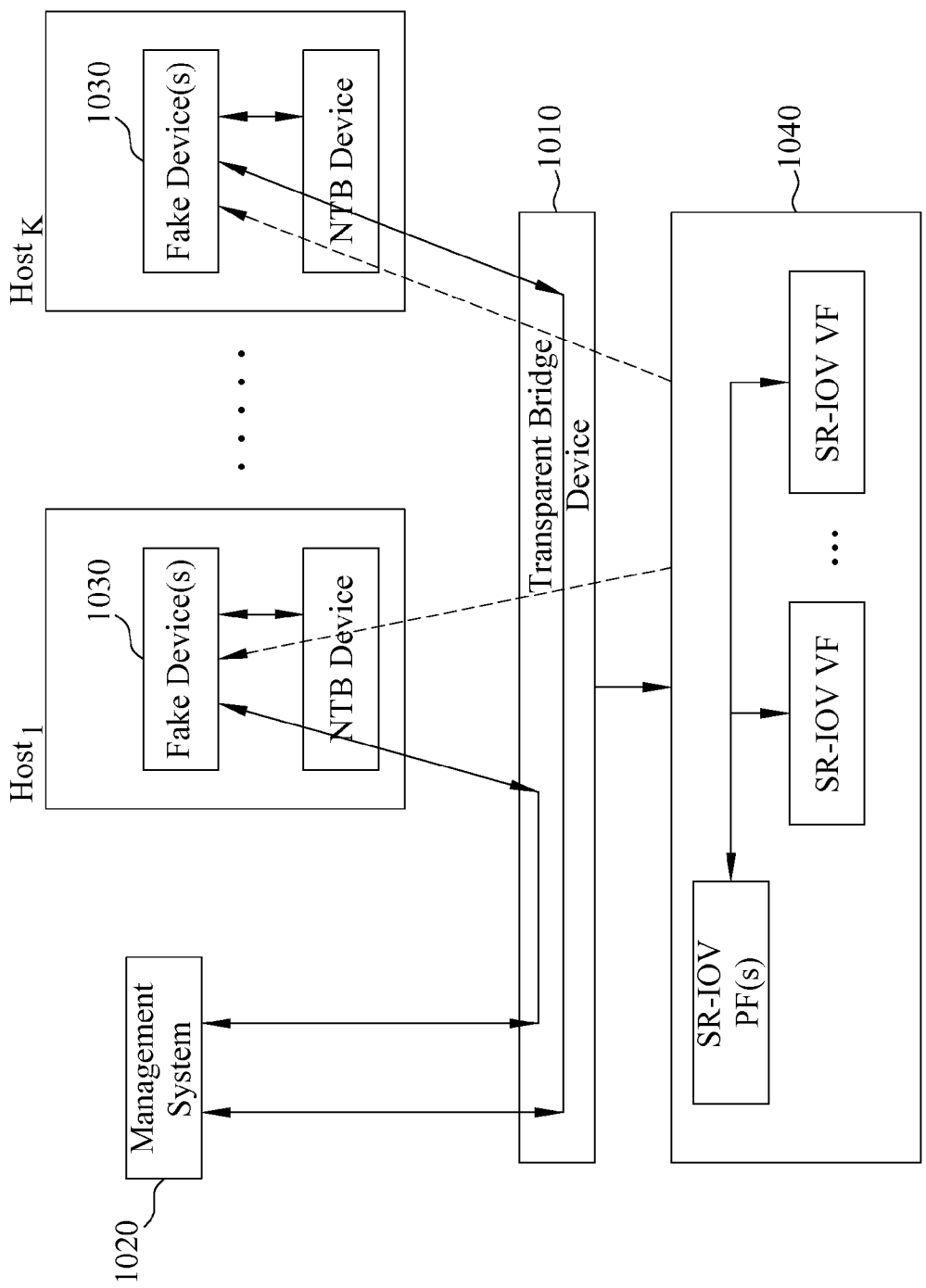
FIG. 10 shows a system for SR-IOV Virtual Functions (VFs) sharing on multi-hosts, according to an exemplary embodiment.

FIG. 10 shows a system for SR-IOV Virtual Functions (VFs) sharing on multi-hosts, according to an exemplary embodiment. Referring to FIG. 10, the system 1000 for SR-IOV Virtual Functions (VFs) sharing on multi-hosts may comprise a transparent bridge device 1010, a management system 1020 connected to the transparent device 1020, and one or more fake devices 1030 simulated in each of one or more hosts (for example $host_1, \ldots, host_k$) with each fake device corresponding to one of SR-IOV virtual functions on a SR-IOV device 1040. The management system 1020 may detect one or more physical functions of the SR-IOV and the SR-IOV virtual functions extended from the one or more physical functions, and configure one or more NTB devices in the one or more hosts. Each of the one or more hosts may detect the existence of the fake devices, and load a NTB driver to map the fake devices 1030 and the SR-IOV virtual functions. Then, the host and one or more virtual machine on the host may use the fake devices 1030, such as load an original virtual function driver to use the fake devices 1030.

As mentioned earlier, when the management system 1020 starts up, a kernel of the management system may detect the physical functions of the SR-IOV and the virtual functions extended from the existed physical functions after a physical function driver is loaded. The management system may configure the NTB device by loading a NTB driver. When a shared host of the multi-hosts starts up, a kernel of the shared host may detect the existence of the fake devices, and load the NTB driver to map the fake devices and the SR-IOV virtual functions. Then, the shared host and the virtual machine(s) thereon may load the original virtual function driver to use the fake devices. The detailed of simulating fake I/O devices in a host's kernel to share the SR-IOV virtual functions has been described such as in FIG. 6, FIG. 9A, FIG. 9B, and aforementioned exemplary embodiments. The detailed architectures of multiple virtual functions sharing into a single host have also been described in the aforementioned exemplary embodiments such as FIG. 7 and aforementioned exemplary embodiments.

Figure 11:
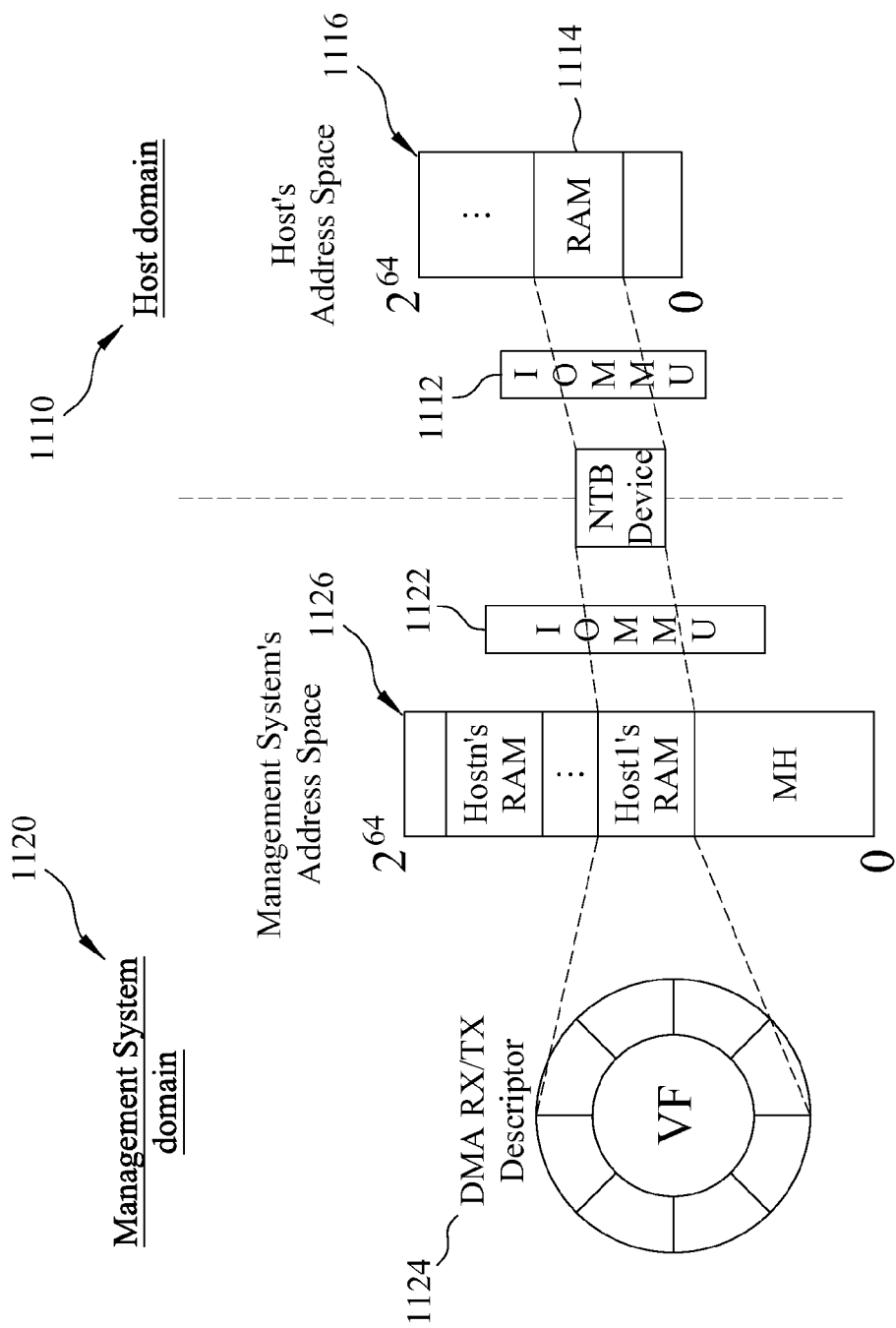
FIG. 11 shows a schematic view illustrating the architectures of memory usage of a shared virtual function driver, according to an exemplary embodiment.

The exemplary embodiments in the present disclosure design the system and method that allows multiple hosts and their virtual machines to share the virtual functions of SR-IOV devices. The exemplary embodiments also let the sharing operations of the SR-IOV virtual functions more secure and transparent. In other words, through one or more NTB devices, a zero-modification SR-IOV virtual function driver may work directly on hosts and virtual machines with a data zero-copy operation. FIG. 11 shows a schematic view illustrating the architectures of memory usage of a shared virtual function driver, according to an exemplary embodiment.

In the FIG. 11, an input/output memory management unit (IOMMU) 1112 in a host domain 1110 is enabled. For each host with fake devices, a full range of a corresponding random access memory (RAM) 1114 of the host in a host's address space (for example, from address 0 to address $2^{64}$) 1116 is all mapped into an unoccupied address space of a management system through a NTB device. For example, for the host1 with fake devices, the full range of the RAM 1114 is all mapped into an unoccupied address space called host1's RAM of the management system's address space (for example, from address 0 to address $2^{64}$) 1126. An IOMMU 1122 in the management system domain 1120 is configured to limit the memory access range of shared virtual functions and fake devices. In other words, the host and virtual machines use the shared virtual functions will not affect other hosts or virtual machines unintentionally or maliciously. The IOMMU in the host side is configured to limit each shared fake device not to access other shared fake devices' memories. The IOMMU in management system side is configured to protect each host not to touch other host. Both the management system side and the host side configure the NTB device, so that the memory address and interrupt address are remapped from SR-IOV virtual functions to the host with the fake devices. When an original virtual function driver allocates a DMA memory, the DMA address in a DMA receiver/transmitter (RX/TX) descriptor 1124 is redirected from SR-IOV virtual functions to a corresponding data buffer in the host. The SR-IOV virtual functions on the management system side may access the data buffer in the host by a DMA operation. Thus, another data copy from a mapped buffer to a data buffer is not necessary. The zero-modification original SR-IOV virtual function driver may work directly on the host and virtual machines thereon with a data zero-copy operation, according to the exemplary embodiment of the present disclosure.

In other words, to let the sharing operations of the SR-IOV virtual functions more secure and transparent, the exemplary embodiments may enable an IOMMU in the host and an IOMMU in the management system, configure the both IOMMUs and a NTB remapping of the memory address and the interrupt address, and redirect a DMA address from the SR-IOV virtual functions to a corresponding memory on the host when an original virtual function driver allocates a DMA memory. Wherein the IOMMU in the management system may limit the memory access range of the shared virtual functions and the fake devices.

Figure 12:
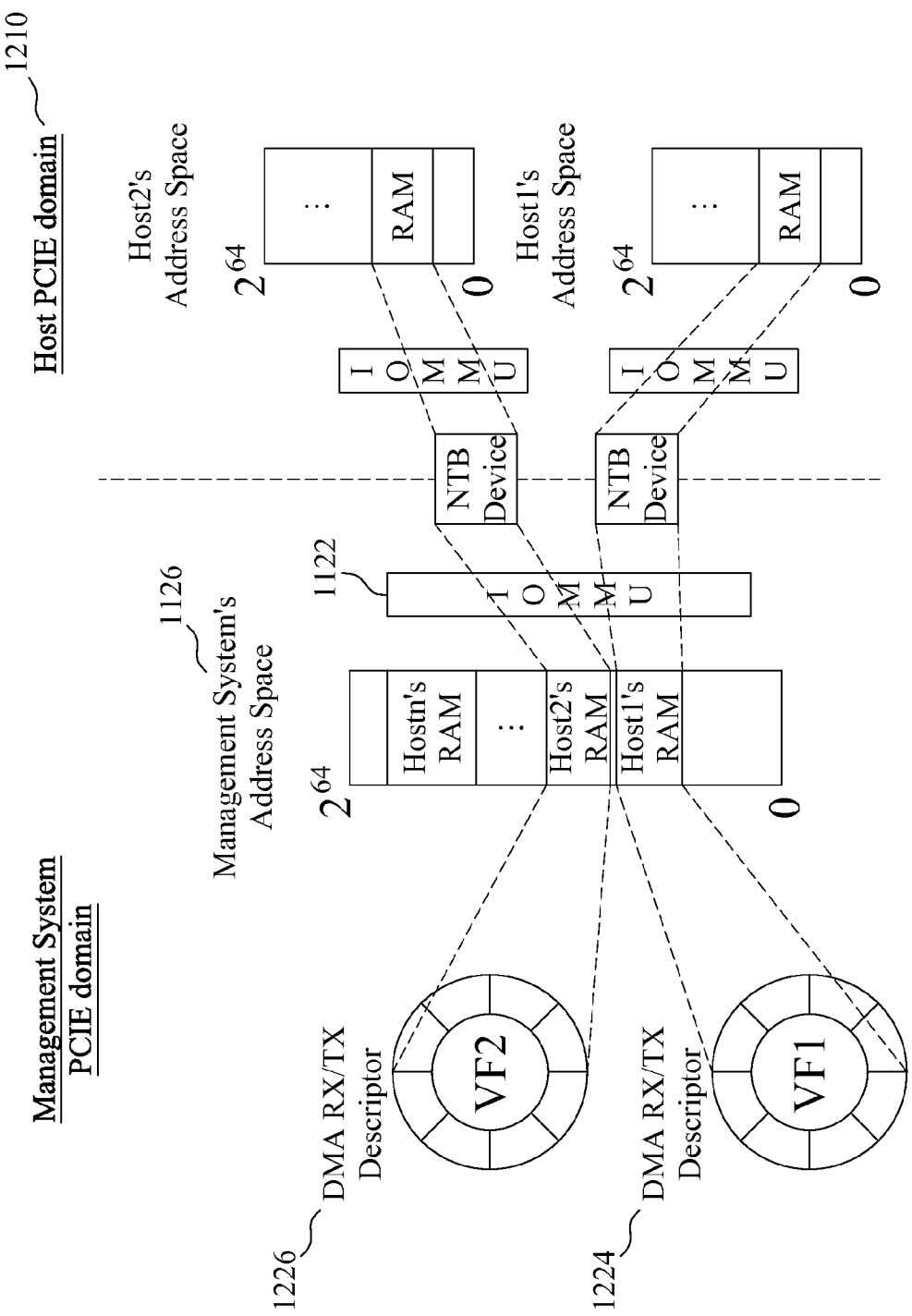
FIG. 12 shows a schematic view illustrating the architectures of memory usage of a shared virtual function driver in the multi-hosts environment, according to an exemplary embodiment.

FIG. 12 shows a schematic view illustrating the architectures of memory usage of shared virtual function driver in a multi-hosts environment, according to an exemplary embodiment. In the multi-hosts environment of FIG. 12, each host in a host domain 1210 has a respective host's address space. Shared virtual functions by each host have a corresponding DMA RX/TX descriptor in the management system domain. For example, host1 has a host1's address space and host2 has a host2's address space. Shared virtual functions by host1 have a respective DMA RX/TX descriptor 1224. Shared virtual functions by host2 have a respective DMA RX/TX descriptor 1226. All IOMMUs in the host domain 1210 are enabled. For example, one IOMMU corresponding to the host1's address space and another IOMMU corresponding to the host2's address space are all enabled. For each host with fake devices, the full range of its RAM is all mapped into a address space called the host's RAM of the management system's address space 1126 through a respective NTB device of the host. The SR-IOV virtual functions on the management system side may access the data buffer in each host by a DMA operation. When an original virtual function driver allocates a DMA memory, the DMA address in a DMA receiver/transmitter (RX/TX) descriptor is redirected from the SR-IOV virtual functions to a corresponding memory on a corresponding host with fake devices. Thus, the zero-modification original SR-IOV virtual function driver may work directly on the multi-hosts environment and virtual machines thereon with data zero-copy operation.

The above exemplary embodiments of the disclosure provide a method and system to share SR-IOV virtual functions of a SR-IOV device between multiple hosts through the non-transparent bridge (NTB) device of each host. The exemplary embodiments simulate fake devices in each host with each fake device corresponding to the SR-IOV virtual functions, redirect each configuration space from each SR-IOV virtual function to each fake devices, redirect each configuration space request from a corresponding fake device to a corresponding SR-IOV virtual function when the configuration space request is received, and redirect each memory access operation from the corresponding SR-IOV virtual function to a mapped memory on the host with the corresponding fake device, and each interrupt generated by SR-IOV virtual machines to the corresponding fake device. The exemplary embodiments also design the architectures of memory usage of the shared virtual function driver in a single host or a multi-hosts environment. The zero-modification original SR-IOV virtual function driver may work directly on the multi-hosts environment and virtual machines with data zero-copy operation to securely and transparently share the SR-IOV virtual functions of the SR-IOV device between the multiple hosts.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for single-root input/output virtualization (SR-IOV) virtual functions sharing on one or more hosts, implemented in a management system connected to the one or more hosts by a transparent bridge device, comprising:
   simulating one or more simulated devices in the one or more hosts with each simulated device mapped to one of a plurality of SR-IOV virtual functions of a SR-IOV device;
   redirecting each of one or more configuration spaces from a corresponding one of the plurality of SR-IOV virtual functions to a corresponding one of the one or more simulated devices in the one or more hosts, through a non-transparent bridge (NTB) device in each of the one or more hosts, wherein the one or more hosts is connected with the transparent bridge device by the respective NTB device in each of the one or more hosts;
   redirecting each of one or more configuration space requests from the corresponding one of the one or more simulated devices to a corresponding SR-IOV virtual function of the corresponding one of the one or more simulated devices when the configuration space request is received by the corresponding one of the one or more simulated devices; and
   redirecting each of one or more memory access operations from the corresponding SR-IOV virtual function to a mapped memory on a corresponding host of the one or more hosts having the corresponding one of the one or more simulated devices; and
   redirecting each of one or more interrupts generated by one or more SR-IOV virtual machines hosted on the one or more hosts to the corresponding one of the one or more simulated devices,
   wherein each of the one or more hosts has an address space of the respective host and the management system has a corresponding direct memory access (DMA) descriptor for the one or more virtual functions of the corresponding host, and wherein a full range of a corresponding random access memory of the corresponding host in the address space of the respective host is all mapped into an unoccupied address space of the management system through the NTB device in each of the one or more hosts.

2. The method as claimed in claim 1, wherein the one or more simulated devices are simulated by each of one or more kernels in the one or more hosts.

3. The method as claimed in claim 2, wherein the one or more simulated devices are simulated by interpreting one or more read or write routines in a kernel of one of the one or more hosts and feeding back a correct response when the kernel accesses the one or more simulated devices.

4. The method as claimed in claim 1, wherein the mapped memory acts as a direct memory access buffer, and a Message-Signaled-Interrupt (MSI) address of the corresponding SR-IOV virtual function is remapped to a MSI address of the corresponding host having the corresponding one of the one or more simulated devices.

5. The method as claimed in claim 1, wherein each of the one or more SR-IOV virtual machines on the one or more hosts is allowed to share the plurality of SR-IOV virtual functions of the SR-IOV device.

6. The method as claimed in claim 1, wherein through each of the NTB device in the one or more hosts, an original SR-IOV virtual function driver is to work directly on the one or more hosts and the one or more SR-IOV virtual machines with a data zero-copy operation.

7. The method as claimed in claim 1, wherein said method further includes:

enabling a first input/output memory management unit (IOMMU) in the management system and a second IOMMU in each of the one or more hosts;

configuring the first IOMMU and the second IOMMU and a NTB remapping of a memory address and an interrupt address; and redirecting a DMA address from the plurality of SR-IOV virtual functions to a corresponding memory in each of the one or more hosts when an original virtual function driver allocates a DMA memory.

8. The method as claimed in claim 7, wherein the first IOMMU in the management system limits a memory access range of the plurality of virtual functions and the one or more simulated devices.

9. The method as claimed in claim 7, wherein the second IOMMU in each of the one or more hosts limits each of the one or more simulated devices from accessing memories of other simulated devices.

10. The method as claimed in claim 7, wherein the DMA address in the DMA descriptor is redirected from the plurality of SR-IOV virtual functions to a data buffer in each of the one or more hosts, and the plurality of SR-IOV virtual functions on the management system access the data buffer in the respective host by a DMA operation.

* * * * *